(12) United States Patent
Lee et al.

(10) Patent No.: US 11,991,374 B2
(45) Date of Patent: May 21, 2024

(54) DISPLAY APPARATUS AND DRIVING METHOD THEREOF

(71) Applicant: LG Display Co., Ltd., Seoul (KR)

(72) Inventors: JoonHee Lee, Seoul (KR); NamKon Ko, Seoul (KR); Dongwon Park, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 242 days.

(21) Appl. No.: 17/510,025

(22) Filed: Oct. 25, 2021

(65) Prior Publication Data
US 2022/0210450 A1   Jun. 30, 2022

(30) Foreign Application Priority Data

Dec. 31, 2020   (KR) ................. 10-2020-0189236

(51) Int. Cl.
*H04N 19/169*   (2014.01)
*G09G 3/20*   (2006.01)
(Continued)

(52) U.S. Cl.
CPC ....... *H04N 19/1883* (2014.11); *G09G 3/2003* (2013.01); *G09G 3/3225* (2013.01);
(Continued)

(58) Field of Classification Search
CPC ............. H04N 19/1883; H04N 19/186; G09G 3/2003; G09G 3/3225; G09G 5/006; G09G 2350/00
See application file for complete search history.

(56) References Cited

U.S. PATENT DOCUMENTS

| 8,103,112 B2 | 1/2012 | Horie et al. |
| 10,212,419 B2 | 2/2019 | Hinz et al. |
| (Continued) | | |

FOREIGN PATENT DOCUMENTS

| CN | 101241235 A | 8/2008 |
| CN | 104904207 A | 9/2015 |
| (Continued) | | |

OTHER PUBLICATIONS

English Translation of JP 2006058683 (Year: 2006).*
(Continued)

*Primary Examiner* — Patrick N Edouard
*Assistant Examiner* — Eboni N Giles
(74) *Attorney, Agent, or Firm* — Fenwick & West LLP

(57) ABSTRACT

A display apparatus includes an encoder which compresses first image data to generate second image data, a decoder which recovers the first image data to generate third image data, and a display panel which displays an image, in which the encoder separates the first image data into a plurality of sub-color data, and generates a low frequency component of minor sub-color data among the plurality of sub-color data and the remaining sub-color data as the second image data, and the decoder generates recovery minor sub-color data corresponding to the minor sub-color data by using the low frequency component of the minor sub-color data and the high frequency component of one of the remaining sub-color data in the second image data, and generates the recovery minor sub-color data and the remaining sub-color data as the third image data.

10 Claims, 4 Drawing Sheets

(51) Int. Cl.
*G09G 3/3225* (2016.01)
*G09G 5/00* (2006.01)
*H04N 19/186* (2014.01)

(52) U.S. Cl.
CPC ........... *G09G 5/006* (2013.01); *H04N 19/186* (2014.11); *G09G 2350/00* (2013.01)

(56) References Cited

U.S. PATENT DOCUMENTS

| | | | |
|---|---|---|---|
| 10,212,420 B2 | 2/2019 | Hinz et al. | |
| 10,218,973 B2 | 2/2019 | Hinz et al. | |
| 10,477,210 B2 | 11/2019 | Hinz et al. | |
| 10,681,348 B2 | 6/2020 | Hinz et al. | |
| 10,687,059 B2 | 6/2020 | Hinz et al. | |
| 10,694,182 B2 | 6/2020 | Hinz et al. | |
| 10,694,183 B2 | 6/2020 | Hinz et al. | |
| 11,134,255 B2 | 9/2021 | Hinz et al. | |
| 11,323,745 B2 | 5/2022 | Rosewarne et al. | |
| 11,477,467 B2 | 10/2022 | Hinz et al. | |
| 11,575,921 B2 | 2/2023 | Hinz et al. | |
| 11,589,062 B2 | 2/2023 | Hinz et al. | |
| 2005/0105608 A1* | 5/2005 | Coleman | H04N 21/4143 375/240.01 |
| 2008/0193026 A1 | 8/2008 | Horie et al. | |
| 2011/0149110 A1* | 6/2011 | Sugiyama | H04N 19/146 348/E9.008 |
| 2015/0195566 A1 | 7/2015 | Hinz et al. | |
| 2016/0014412 A1 | 1/2016 | Hinz et al. | |
| 2016/0014416 A1 | 1/2016 | Hinz et al. | |
| 2016/0014425 A1 | 1/2016 | Hinz et al. | |
| 2016/0014430 A1 | 1/2016 | Hinz et al. | |
| 2016/0140696 A1* | 5/2016 | Yamada | H04N 25/134 382/167 |
| 2019/0058882 A1 | 2/2019 | Hinz et al. | |
| 2019/0110046 A1 | 4/2019 | Hinz et al. | |
| 2019/0116360 A1 | 4/2019 | Hinz et al. | |
| 2019/0136394 A1* | 5/2019 | Edgar | C25B 15/031 |
| 2020/0007869 A1 | 1/2020 | Hinz et al. | |
| 2020/0014956 A1 | 1/2020 | Rosewarne et al. | |
| 2020/0244959 A1 | 7/2020 | Hinz et al. | |
| 2020/0260077 A1 | 8/2020 | Hinz et al. | |
| 2020/0322603 A1 | 10/2020 | Hinz et al. | |
| 2020/0404266 A1 | 12/2020 | Hinz et al. | |
| 2021/0136394 A1* | 5/2021 | Sakamoto | H04N 19/186 |
| 2021/0266563 A9 | 8/2021 | Hinz et al. | |
| 2021/0409739 A1 | 12/2021 | Hinz et al. | |
| 2022/0400271 A1 | 12/2022 | Hinz et al. | |
| 2023/0262241 A1 | 8/2023 | Hinz et al. | |
| 2023/0262242 A1 | 8/2023 | Hinz et al. | |

FOREIGN PATENT DOCUMENTS

| | | |
|---|---|---|
| CN | 110419222 A | 11/2019 |
| KR | 10-2020-0046281 A | 5/2020 |

OTHER PUBLICATIONS

English Translation of KR 20160033827 (Year: 2016).*
English Translation of TW 560188 (Year: 2003).*
China National Intellectual Property Administration, Notice of Allowance, Chinese Patent Application No. 202111453996.8, dated Jan. 5, 2024, eight pages.
Yang, C. et al. "Deep Image Compression in the Wavelet Transform Domain Based on High Frequency Sub-Band Prediction." IEEE Access, vol. 7, Apr. 16, 2019, pp. 52484-52497.

* cited by examiner

DISPLAY APPARATUS AND DRIVING METHOD THEREOF

CROSS-REFERENCE TO RELATED APPLICATIONS

This application claims the priority of Korean Patent Application No. 10-2020-0189236 filed on Dec. 31, 2020, in the Korean Intellectual Property Office, which is incorporated herein by reference.

BACKGROUND

Field

The present disclosure relates to a display apparatus, and more particularly, to a display apparatus capable of reducing a data bandwidth.

Description of the Related Art

Currently, with the full-fielded information age, a display apparatus field of visually displaying electrical information signals has been rapidly developed, and studies to develop performance such as thinning, lightweight and low power consumption for various display apparatuses have been continuously conducted.

Among various display apparatuses, an organic display apparatus is a self-emission display apparatus and, unlike a liquid crystal display apparatus, does not require a separate light source to be manufactured in lightweight and thin. Further, the organic display apparatus is not only advantageous in terms of power consumption by low voltage driving, but also has excellent color implementation, response speed, viewing angle, and contrast ratio (CR), and thus, has been studied as a next generation display.

SUMMARY

An object to be achieved by the present disclosure is to provide a display apparatus with a reduced data bandwidth required for implementing a high-resolution display.

Another object to be achieved by the present disclosure is to provide a display apparatus with excellent data recovery after compression of image data.

Objects of the present disclosure are not limited to the above-mentioned objects, and other objects, which are not mentioned above, can be clearly understood by those skilled in the art from the following descriptions.

According to an aspect of the present disclosure, the display apparatus includes: an encoder which compresses first image data to generate second image data, a decoder which recovers the first image data based on the second image data from the encoder to generate third image data, and a display panel which displays an image based on the third image data, in which the encoder separates the first image data into a plurality of sub-color data, and generates a low frequency component of minor sub-color data among the plurality of sub-color data and the remaining sub-color data as the second image data, and the decoder generates recovery minor sub-color data corresponding to the minor sub-color data by using the low frequency component of the minor sub-color data and the high frequency component of one of the remaining sub-color data in the second image data, and generates the recovery minor sub-color data and the remaining sub-color data as the third image data.

According to another aspect of the present disclosure, the driving method of the display apparatus includes: generating second image data by compressing first image data, and generating third image data by recovering the first image data based on the second image data, in which the generating of the second image data includes separating the first image data into a plurality of sub-color data, and generating a low frequency component of minor sub-color data among the plurality of sub-color data and the remaining sub-color data as the second image data, and the generating of the third image data includes generating recovery minor sub-color data corresponding to the minor sub-color data by using the low frequency component of the minor sub-color data and the high frequency component of one of the remaining sub-color data in the second image data, and generating the recovery minor sub-color data and the remaining sub-color data as the third image data.

Other detailed matters of the exemplary embodiments are included in the detailed description and the drawings.

According to the present disclosure, it is possible to minimize a bandwidth required for transmitting image data by extracting a high frequency component of the image data through discrete wavelet transform (DWT) and realigning data.

According to the present disclosure, it is possible to improve data recovery when recovering the image data by recovering minor sub-color data by using a high frequency component of major sub-color data.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
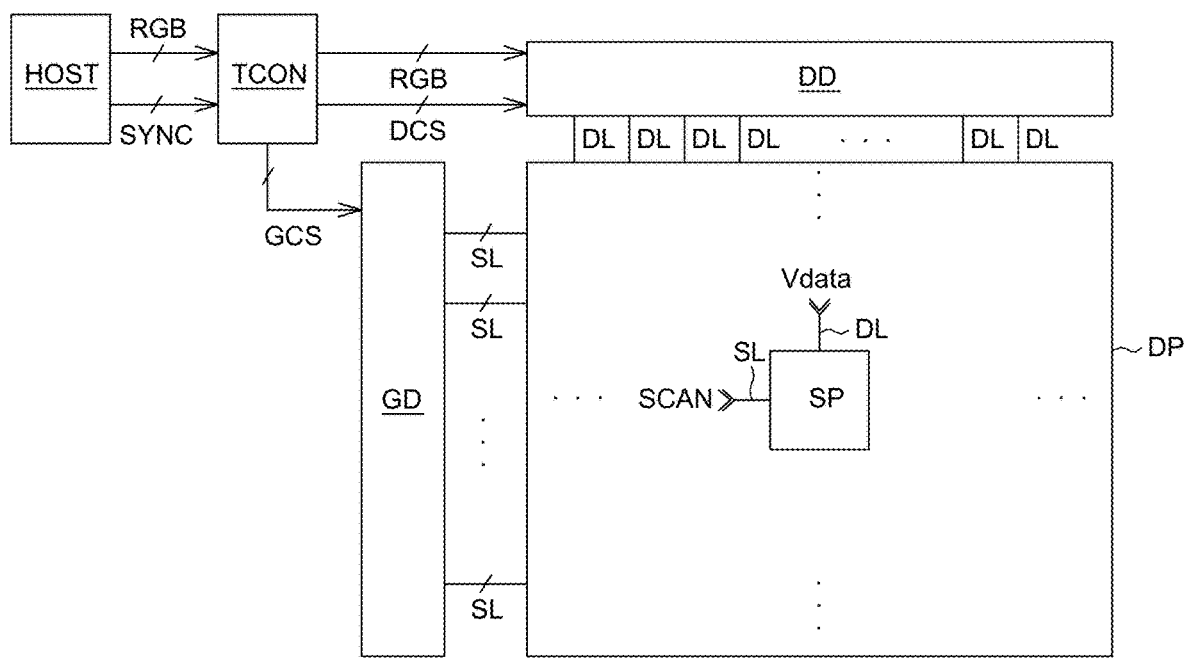
FIG. 1 is a schematic block diagram of a display apparatus according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is disposed "on" another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, a stretchable display device according to exemplary embodiments of the present disclosure will be described in detail with reference to accompanying drawings.

FIG. 1 is a schematic block diagram of a display apparatus according to an exemplary embodiment of the present disclosure. In FIG. 1, for convenience of description, among various components of a display apparatus 100, a display panel DP, a gate driver GD, a data driver DD, a timing controller TCON, and a host system HOST have been just illustrated.

Referring to FIG. 1, the display apparatus 100 includes a display panel DP including a plurality of subpixels SP, a gate driver GD and a data driver DD supplying various signals to the display panel DP, and a timing controller TCON controlling the gate driver GD and the data driver DD.

The gate driver GD supplies a plurality of scan signals SCAN to a plurality of scan lines SL according to a plurality of gate control signals GCS provided from the timing controller TCON. In FIG. 1, one gate driver GD is illustrated to be spaced apart from one side of the display panel DP, but the gate driver GD may be disposed in a gate in panel (GIP) method, and the number and the arrangement of the gate driver GD are not limited thereto.

The data driver DD converts image data RGB input from the timing controller TCON to a data signal Vdata by using a reference gamma voltage according to a plurality of data control signals DCS provided from the timing controller TCON. The data driver DD may supply the converted data signal Vdata to a plurality of data lines DL.

The timing controller TCON aligns the image data RGB input from the host system HOST to supply the aligned image data to the data driver DD. The timing controller TCON may generate a gate control signal GCS and a data control signal DCS by using synchronization signals SYNC input from the host system HOST, for example, a dot clock signal, a data enable signal, and a horizontal/vertical synchronization signal. In addition, the timing controller TCON may supply the generated gate control signal GCS and data control signal DCS to the gate driver GD and the data driver DD, respectively, to control the gate driver GD and data driver DD.

The host system HOST includes a system on chip SoC embedded with a scaler, and converts and outputs digital video data of the input image to the image data RGB in a format suitable for being displayed on the display panel DP. The host system HOST provides a synchronization signal SYNC, such as a dot clock signal, a data enable signal, and a horizontal/vertical synchronization signal, together with the image data RGB to the timing controller TCON.

The display panel DP includes a plurality of subpixels SP as a configuration for displaying the image to a user. In the display panel DP, the plurality of scan lines SL and the plurality of data lines DL cross with each other, and each of the plurality of subpixels SP is connected to the scan line SL and the data line DL. In addition, although not illustrated, each of the plurality of subpixels SP may be connected to a high-potential power supply line, a low-potential power supply line, an initialization signal line, an emission control signal line, and the like.

The plurality of subpixels SP are minimum units of configuring a screen, and each of the plurality of subpixels SP includes a light emitting diode and a pixel circuit for driving the light emitting diode. The plurality of light emitting diodes may be defined differently depending on a type of display panel DP, and for example, when the display panel DP is an organic light emitting display panel, the light emitting diode may be an organic light emitting diode including an anode, an organic layer, and a cathode. In addition, as the light emitting diode, a quantum dot light emitting diode (OLED) including quantum dots QDs, an inorganic light emitting diode (LED), and the like may be further used. Hereinafter, the light emitting diode is assumed to be an organic light emitting diode, but a type of light emitting diode is not limited thereto.

A pixel circuit is a circuit for controlling the driving of the light emitting diode. The pixel circuit may be configured to include, for example, a plurality of transistors and one or more capacitors, but is not limited thereto.

Hereinafter, an encoder ICD and a decoder DCD in the display apparatus 100 according to an exemplary embodiment of the present disclosure will be described in more detail with reference to FIGS. 2 to 5.

Figure 2:
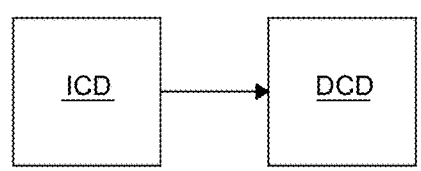
FIG. 2 is a block diagram of an encoder and a decoder of the display apparatus according to an exemplary embodiment of the present disclosure.
Figure 3:
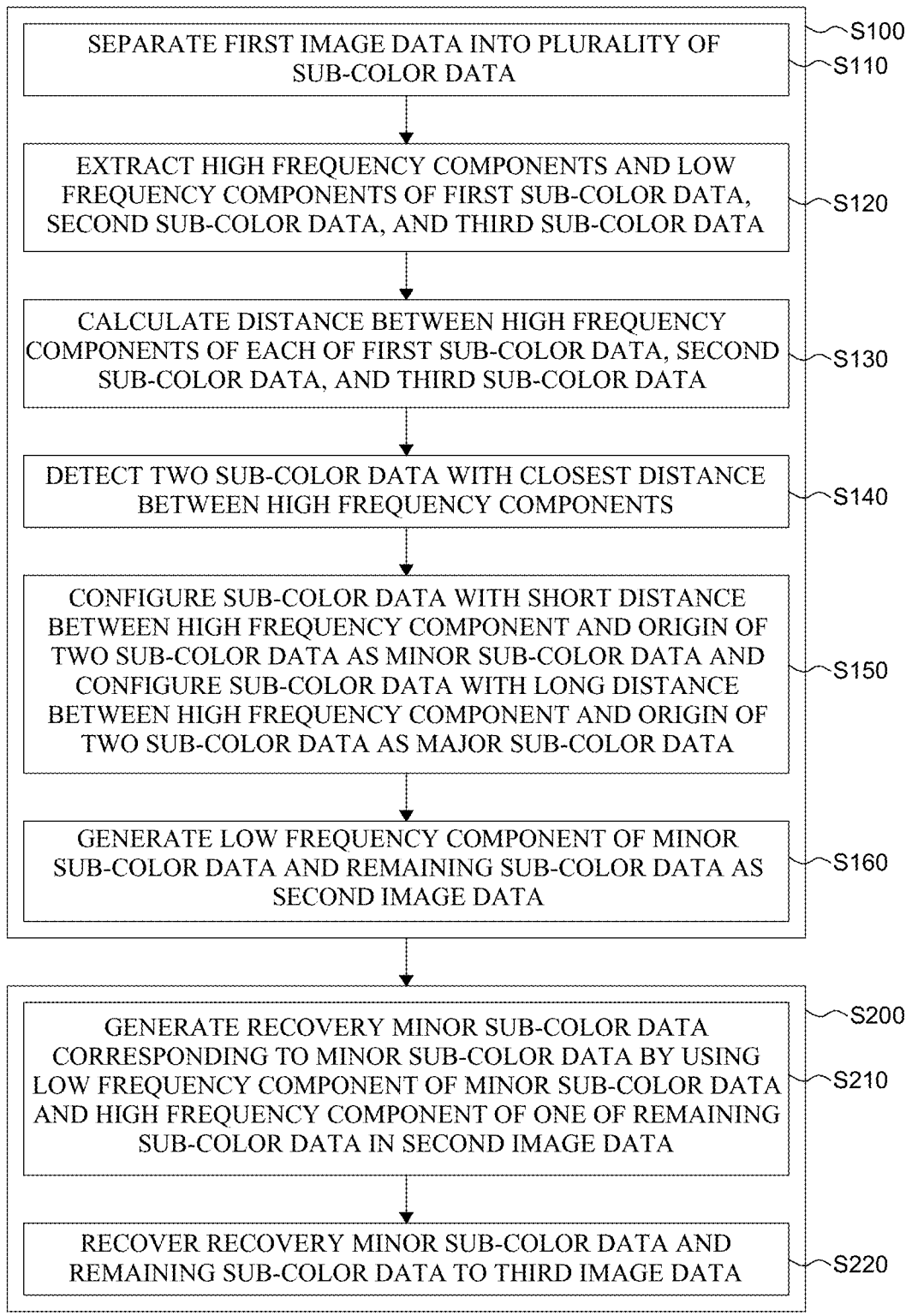
FIG. 3 is a flowchart for describing a driving method of the display apparatus according to an exemplary embodiment of the present disclosure.

FIG. 2 is a block diagram of an encoder and a decoder of the display apparatus according to an exemplary embodiment of the present disclosure. FIG. 3 is a flowchart for describing a driving method of the display apparatus according to an exemplary embodiment of the present disclosure.

Figure 4:
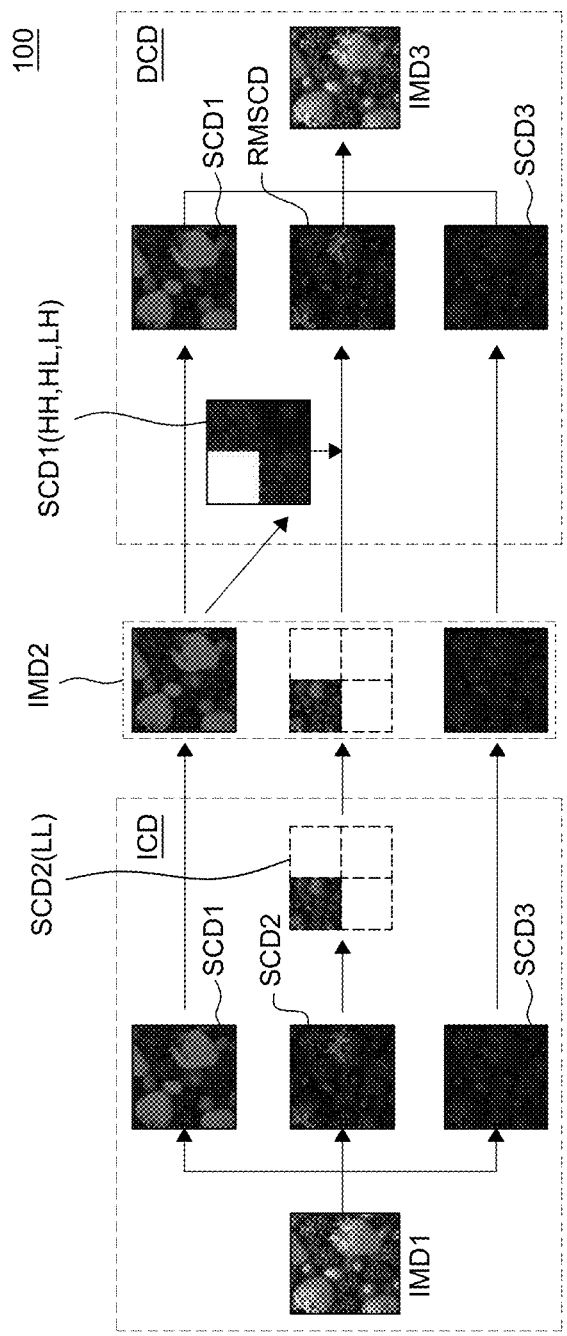
FIG. 4 is a schematic diagram for describing encoding and decoding of the display apparatus according to an exemplary embodiment of the present disclosure.
Figure 5:
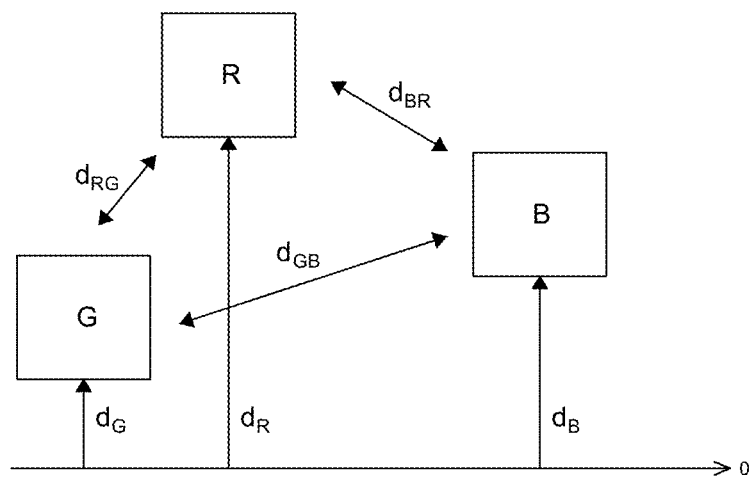
FIG. 5 is a schematic diagram for describing an encoder of the display apparatus according to an exemplary embodiment of the present disclosure.

FIG. 4 is a schematic diagram for describing encoding and decoding of the display apparatus according to an exemplary embodiment of the present disclosure. FIG. 5 is a schematic diagram for describing an encoder of the display apparatus according to an exemplary embodiment of the present disclosure.

Referring to FIG. 2, the display apparatus 100 further includes an encoder ICD and a decoder DCD.

The encoder ICD may compress first image data IMD1 to generate second image data IMD2. Here, the first image data IMD1 may be image data input to the encoder ICD, and the second image data IMD2 may be image data output from the encoder ICD to the decoder DCD.

The decoder DCD recovers the first image data IMD1 based on the second image data IMD2 from the encoder ICD to generate third image data IMD3. The third image data IMD3 may be image data output from the decoder DCD.

The display panel DP may display an image based on the third image data IMD3.

The encoder ICD may be disposed in the host system HOST, and the decoder DCD may be disposed on the timing controller TCON. At this time, the first image data IMD1 may be image data input to the host system HOST, the second image data IMD2 may be image data output from the host system HOST to be input to the timing controller TCON, and the third image data IMD3 may be image data output from the timing controller TCON to be input to the data driver DD.

On the other hand, in some exemplary embodiments, the encoder ICD may be disposed in the timing controller TCON, and the decoder DCD may be input to the data driver DD. The first image data IMD1 may be image data input to the timing controller TCON, the second image data IMD2 may be image data output from the timing controller TCON to be input to the data driver DD, and the third image data IMD3 may be image data recovered in the data driver DD.

In the present disclosure, the first image data IMD1 is described as the RGB image data, but is not limited thereto, and all data used in the display apparatus 100 such as screen compensation data are applicable.

For the more detailed description for the display apparatus 100 according to an exemplary embodiment of the present disclosure and a driving method (S100) of the display apparatus, referring to FIG. 3, the encoder ICD compresses the first image data IMD1 to generate the second image data IMD2 (S100), and the decoder DCD recovers the first image data IMD1 based on the second image data IMD2 to generate the third image data IMD3 (S200).

First, the encoder ICD separates the first image data IMD1 into a plurality of sub-color data SCD (S110). The plurality of sub-color data SCD may include first sub-color data SCD1, second sub-color data SCD2, and third sub-color data SCD3. In the present disclosure, it is described that the first sub-color data SCD1 is red sub-color data, the second sub-color data SCD2 is green sub-color data, and the third sub-color data SCD3 is blue sub-color data, but it is not limited thereto.

Next, the encoder ICD extracts high frequency components and low frequency components of the first sub-color data SCD1, the second sub-color data SCD2, and the third sub-color data SCD3 (S120). At this time, the encoder ICD may extract the high frequency components and the low frequency components of the first sub-color data SCD1, the second sub-color data SCD2, and the third sub-color data SCD3 by using discrete wavelet transform. However, it is not limited thereto, and all transforms capable of extracting the high frequency components and the low frequency components, such as Fourier Transform, Fast Fourier Transformation, and Discrete Cosine Transform, may be used. Hereinafter, for convenience of the description, it will be described that the encoder ICD extracts high frequency components and low frequency components of the first sub-color data SCD1, the second sub-color data SCD2, and the third sub-color data SCD3 by using discrete wavelet transform.

The discrete wavelet transform is a transform capable of extending digital signals by using a low-pass filter and a high-pass filter. The discrete wavelet transform is a one-dimensional transform that is performed by separating rows and columns of the image. The discrete wavelet transform performs the low-pass filter and the high-pass filter from the image to generate a low (L) image and a high (H) image and then repeats the low-pass filter and the high-pass filter for the L image and the H image. As a result, four different images LL, LH, HL, and HH are generated, and these four different images are referred to as subbands. The LL subband LL is an approximate value of the image and is a subband from which all high frequency information is removed. The LH subband LH is an image in which a vertical edge is emphasized, as a subband from which the high frequency information is removed along a row and the high frequency information is emphasized along a column. The HL subband HL is an image in which a horizontal edge is emphasized. The HH subband HH is an image in which a diagonal edge is emphasized. Here, the high frequency components are the HH subband HH, the HL subband HL, and the LH subband LH, and the low frequency component is the LL subband LL.

Next, the encoder ICD calculates a distance between the high frequency components of the first sub-color data SCD1, the second sub-color data SCD2, and the third sub-color data SCD3, respectively (S130). The encoder ICD may calculate a distance between the high frequency components of the first sub-color data SCD1, the second sub-color data SCD2, and the third sub-color data SCD3, respectively, by using a method such as a mean squared error (MSE). In FIG. 5, it has been illustrated that the high frequency component of the first sub-color data SCD1 is R, the high frequency component of the second sub-color data SCD2 is G, and the high frequency component of the third sub-color data SCD3 is B. Further, in FIG. 5, it has been illustrated that a distance between the high frequency component of the first sub-color data SCD1 and the high frequency component of the second sub-color data SCD2 is $d_{RG}$, a distance between the high frequency component of the second sub-color data SCD2 and the high frequency component of the third sub-color data SCD3 is $d_{GB}$, and a distance between the high frequency component of the third sub-color data SCD3 and the high frequency component of the first sub-color data SCD1 is $d_{BR}$.

Next, the encoder ICD detects two sub-color data SCD with the closest distance between the high frequency components (S140). In FIG. 5, it is assumed that the distance $d_{RG}$ between the high frequency component of the first sub-color data SCD1 and the high frequency component of the second sub-color data SCD2 is a minimum value.

Next, the encoder ICD configures sub-color data SCD with a short distance between the high frequency component and an origin of the two sub-color data SCD with the closest distance between the high frequency components as minor sub-color data (S150). For example, as illustrated in FIG. 5, when the distance $d_{RG}$ between the high frequency component of the first sub-color data SCD1 and the high frequency component of the second sub-color data SCD2 is the minimum value, the encoder ICD calculates a distance between each of the high frequency component of the first sub-color data SCD1 and the high frequency component of the second sub-color data SCD2 and the origin. In FIG. 5, it has been illustrated that a distance between the high frequency component of the first sub-color data SCD1 and the origin is $d_R$, a distance between the high frequency component of the second sub-color data SCD2 and the origin is $d_G$, and a distance between the high frequency component of the third sub-color data SCD3 and the origin is $d_B$. Further, in FIG. 5, it has been assumed that the distance $d_G$ between the high frequency component of the second sub-color data SCD2 and the origin is smaller than the distance $d_R$ between the high frequency component of the first sub-color data SCD1 and the origin. Thus, the encoder ICD may configure the second sub-color data SCD2 as the minor sub-color data.

In addition, the encoder ICD configures sub-color data SCD with a long distance between the high frequency component and the origin of the two sub-color data SCD with the closest distance between the high frequency components as major sub-color data (S150). Thus, the encoder ICD may configure the first sub-color data SCD1 as the major sub-color data.

Next, the encoder ICD generates a low frequency component of the minor sub-color data and the remaining sub-color data SCD of the plurality of sub-color data SCD as the second image data IMD2 (S160). That is, the encoder ICD may generate low frequency components of the first sub-color data SCD1, the third sub-color data SCD3, and the second sub-color data SCD2 as the second image data IMD2. That is, in the encoder ICD, the first sub-color data SCD1 and the third sub-color data SCD3 transmit complete data to the decoder DCD, while the second sub-color data SCD2 transmits only the low frequency component to the decoder DCD. Specifically, the encoder ICD may generate the HH subband HH, the HL subband HL, the LH subband LH, and the LL subband LL of the first sub-color data SCD1, the HH subband HH, the HL subband HL, the LH subband LH, and the LL subband LL of the third sub-color data SCD3, and the LL subband LL of the second sub-color data SCD2 as the second image data IMD2.

Next, the encoder ICD transmits the second image data IMD2 to the decoder DCD.

Next, the decoder DCD generates recovery minor sub-color data RMSCD corresponding to the minor sub-color data by using the low frequency component of the minor sub-color data and the high frequency component of one of the remaining sub-color data SCD in the second image data IMD2 (S210). The decoder DCD receives second image data IMD2 including the low frequency components of the first sub-color data SCD1, the third sub-color data SCD3, and the second sub-color data SCD2. As described above, the first sub-color data SCD1 and the third sub-color data SCD3 transmit the complete data to the decoder DCD, while the second sub-color data SCD2 transmits only the low frequency component to the decoder DCD. Thus, the decoder DCD performs a recovery for the second sub-color data SCD2, which is the minor sub-color data.

Specifically, the decoder DCD recovers the second sub-color data SCD2 by using the low frequency component of the second sub-color data SCD2 which is the minor sub-color data and the high frequency component of the first sub-color data SCD1, which is the major sub-color data as one of the remaining sub-color data SCD. As described above, since the sub-color data SCD with the closest distance between the second sub-color data SCD2 which is the minor sub-color data and the high frequency component is the major sub-color data, the decoder DCD recovers the second sub-color data SCD2 by using the high frequency component of the first sub-color data SCD1, which is one major sub-color data. Specifically, the decoder DCD may generate recovery minor sub-color data RMSCD corresponding to the second sub-color data SCD2 which is the minor sub-color data by using the HH subband HH, the HL subband HL, and the LH subband LH of the first sub-color data SCD1 and the LL subband LL of the second sub-color data SCD2.

The decoder DCD generates the recovery minor sub-color data RMSCD and the remaining sub-color data SCD as the third image data IMD3. The decoder DCD generates the recovery minor sub-color data RMSCD for the second sub-color data SCD2, the first sub-color data SCD1 and the third sub-color data SCD3 as the third image data IMD3. Accordingly, the decoder DCD may recover the third image data IMD3 corresponding to the first image data IMD1.

In the display apparatus, various data, including image data, may be transmitted between components. As the display apparatus is implemented at high resolution, the image data to be transmitted increases and the data bandwidth also increases. Therefore, there is a problem that an interface unit between a circuit unit and a component for processing the increased image data is expanded.

Accordingly, in the display apparatus 100 according to an exemplary embodiment of the present disclosure, the data bandwidth may be reduced using a frequency domain transform transmission method for the image data. Specifically, in the encoder ICD, only the data corresponding to the low frequency component is transmitted to the decoder DCD with respect to the minor sub-color data of the plurality of sub-color data SCD. The decoder DCD uses the high frequency component of the major sub-color data which is closest to the high frequency component of the minor sub-color data and the low frequency component of the minor sub-color data to generate the recovery minor sub-color data RMSCD for the minor sub-color data. Accordingly, in the display apparatus 100 according to an exemplary embodiment of the present disclosure, the data bandwidth of the image data transmitted between the encoder ICD and the decoder DCD may be reduced to 25%.

Further, in the display apparatus 100 according to an exemplary embodiment of the present disclosure, the minor sub-color data is recovered by using the high frequency component of the major sub-color data, thereby improving the data recovery when recovering the image data. For more detailed description thereof, Table 1 below is referred together.

TABLE 1

|  | Com. Ex. 1 | Com. Ex. 2 | Com. Ex. 3 | Com. Ex. 4 | Ex. |
|---|---|---|---|---|---|
| First sample | 44.372 | 33.433 | 36.973 | 43.356 | 55.789 |
| Second sample | 47.148 | 40.045 | 41.805 | 46.712 | 62.016 |
| Third sample | 49.480 | 40.533 | 43.271 | 49.434 | 54.093 |
| Fourth sample | 48.458 | 42.161 | 43.910 | 48.506 | 52.249 |
| Fifth sample | 49.442 | 40.932 | 43.292 | 50.545 | 54.657 |
| Sixth sample | 43.038 | 34.004 | 36.078 | 39.118 | 41.470 |
| Seventh sample | 44.536 | 35.646 | 38.796 | 43.953 | 47.594 |
| Eighth sample | 49.820 | 40.010 | 42.855 | 50.085 | 52.505 |
| Ninth sample | 48.672 | 40.160 | 42.488 | 47.995 | 53.357 |
| Average PSNR (dB) | 47.219 | 38.547 | 39.340 | 46.634 | 52.637 |

For an experiment for data recovery in the display apparatus 100 according to an exemplary embodiment of the present disclosure, nine sample images were used. In the corresponding experiment, in order to perform the experiment for various data in terms of image luminance and image complexity, the image luminance and the image complexity for the plurality of sample image data were normalized to a value of 0 to 1. Thereafter, the image luminance and the image complexity were divided into three zones, respectively, and a total of nine zones were defined in terms of the image luminance and the image complexity, and first to ninth samples were sampled as sample images corresponding to each of the nine zones. Thereafter, the PSNRs (Peak Signal-To-Noise Ratios) for data before recovery and data after recovery were measured in Comparative Example 1, Comparative Example 2, Comparative Example 3, Comparative Example 4 and Example with respect to the first to ninth samples.

Here, with respect to the data recovery method, Comparative Example 1 used YCbcr422 (recovery method Bilinear), Comparative Example 2 used JPEG (Q=80), Comparative Example 3 used JPEG (Q=90), and Comparative Example 4 used JPEG (Q=100), and Example used the same method as the display apparatus 100 according to an exemplary embodiment of the present disclosure.

Referring to Table 1, in Example, the average PSNR for nine images was measured as the highest of about 52.637 dB as compared with Comparative Examples 1 to 4. Therefore, it is possible to confirm excellent data recovery as compared with a compression algorithm, such as Comparative Examples 1 to 4 which have been used in the related art.

The exemplary embodiments of the present disclosure can also be described as follows.

According to an aspect of the present disclosure, the display apparatus includes: an encoder which compresses first image data to generate second image data, a decoder which recovers the first image data based on the second image data from the encoder to generate third image data, and a display panel which displays an image based on the third image data, in which the encoder separates the first image data into a plurality of sub-color data, and generates a low frequency component of minor sub-color data among the plurality of sub-color data and the remaining sub-color data as the second image data, and the decoder generates recovery minor sub-color data corresponding to the minor sub-color data by using the low frequency component of the minor sub-color data and the high frequency component of one of the remaining sub-color data in the second image data, and generates the recovery minor sub-color data and the remaining sub-color data as the third image data.

The plurality of sub-color data may include first sub-color data, second sub-color data, and third sub-color data. The encoder may extract high frequency components and low frequency components of the first sub-color data, the second sub-color data, and the third sub-color data.

The encoder may extract the high frequency components and the low frequency components of the first sub-color data, the second sub-color data, and the third sub-color data by using discrete wavelet transform.

The high frequency components may be an HH subband, an HL subband, and an LH subband. The low frequency component may be an LL subband.

The encoder may calculate a distance between the high frequency components of each of the first sub-color data, the second sub-color data, and the third sub-color data, and may detect two sub-color data with the closest distance between the high frequency components.

The encoder may configure sub-color data with a short distance between the high frequency component and an origin of the two sub-color data as the minor sub-color data, and may configure sub-color data with a long distance between the high frequency component and the origin of the two sub-color data as major sub-color data.

The decoder may generate the recovery minor sub-color data by using the low frequency component of the minor sub-color data and the high frequency component of the major sub-color data.

The display apparatus may further comprise a host system in which the encoder is disposed and a timing controller in which the decoder is disposed.

The display apparatus may further comprise a timing controller in which the encoder is disposed, and a data driver in which the decoder is disposed.

According to another aspect of the present disclosure, the driving method of the display apparatus includes: generating second image data by compressing first image data, and generating third image data by recovering the first image data based on the second image data, in which the generating of the second image data includes separating the first image data into a plurality of sub-color data, and generating a low frequency component of minor sub-color data among the plurality of sub-color data and the remaining sub-color data as the second image data, and the generating of the third image data includes generating recovery minor sub-color data corresponding to the minor sub-color data by using the low frequency component of the minor sub-color data and the high frequency component of one of the remaining sub-color data in the second image data, and generating the recovery minor sub-color data and the remaining sub-color data as the third image data.

The plurality of sub-color data may include first sub-color data, second sub-color data, and third sub-color data. The generating of the second image data may further include extracting high frequency components and low frequency components of the first sub-color data, the second sub-color data, and the third sub-color data.

The generating of the second image data may further include calculating a distance between the high frequency components of each of the first sub-color data, the second sub-color data, and the third sub-color data, and detecting two sub-color data with the closest distance between the high frequency components.

The generating of the second image data may further include configuring sub-color data with a short distance between the high frequency component and an origin of the two sub-color data as the minor sub-color data and configuring sub-color data with a long distance between the high frequency component and the origin of the two sub-color data as major sub-color data.

The generating of the recovery minor sub-color data may further include generating the recovery minor sub-color data by using the low frequency component of the minor sub-color data and the high frequency component of the major sub-color data.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the

What is claimed is:

1. A display apparatus comprising:
an encoder which compresses first image data to generate second image data;
a decoder which recovers the first image data based on the second image data from the encoder to generate third image data; and
a display panel which displays an image based on the third image data,
wherein the encoder separates the first image data into a plurality of sub-color data, and generates a low frequency component of minor sub-color data among the plurality of sub-color data and remaining sub-color data as the second image data,
the decoder generates recovery minor sub-color data corresponding to the minor sub-color data by using the low frequency component of the minor sub-color data and a high frequency component of one of the remaining sub-color data in the second image data and generates the recovery minor sub-color data and the remaining sub-color data as the third image data,
wherein the plurality of sub-color data includes first sub-color data, second sub-color data, and third sub-color data, and
the encoder extracts high frequency components and low frequency components of the first sub-color data, the second sub-color data, and the third sub-color data,
wherein the encoder calculates a distance between the high frequency components of each of the first sub-color data, the second sub-color data, and the third sub-color data, and
detects two sub-color data with closest distance between the high frequency components,
wherein the encoder configures the sub-color data with a short distance between the high frequency component and an origin of the two sub-color data as the minor sub-color data, and
configures the sub-color data with a long distance between the high frequency component and the origin of the two sub-color data as major sub-color data.

2. The display apparatus of claim 1, wherein the encoder extracts the high frequency components and the low frequency components of the first sub-color data, the second sub-color data, and the third sub-color data by using discrete wavelet transform.

3. The display apparatus of claim 2, wherein the high frequency components are an HH subband, an HL subband, and an LH subband, and the low frequency component is an LL subband.

4. The display apparatus of claim 3, wherein the LH subband is an image in which a vertical edge is emphasized, as a subband from which the high frequency information is removed along a row and the high frequency information is emphasized along a column, the HL subband is an image in which a horizontal edge is emphasized, and the HH subband is an image in which a diagonal edge is emphasized, and the LL subband is an approximate value of the image and is a subband from which all high frequency information is removed.

5. The display apparatus of claim 1, wherein the decoder generates the recovery minor sub-color data by using the low frequency component of the minor sub-color data and the high frequency component of the major sub-color data.

6. The display apparatus of claim 1, wherein the first image data is image data input to the encoder, and the second image data is image data output from the encoder to the decoder, and the third image data is image data output from the decoder.

7. The display apparatus of claim 1, further comprising:
a host system in which the encoder is disposed; and
a timing controller in which the decoder is disposed.

8. The display apparatus of claim 1, further comprising:
a timing controller in which the encoder is disposed; and
a data driver in which the decoder is disposed.

9. A driving method of a display apparatus comprising:
generating second image data by compressing first image data; and
generating third image data by recovering the first image data based on the second image data,
wherein the generating of the second image data includes:
separating the first image data into a plurality of sub-color data, and
generating a low frequency component of minor sub-color data among the plurality of sub-color data and remaining sub-color data as the second image data,
wherein the generating of the third image data includes:
generating recovery minor sub-color data corresponding to the minor sub-color data by using the low frequency component of the minor sub-color data and high frequency component of one of the remaining sub-color data in the second image data; and
generating the recovery minor sub-color data and the remaining sub-color data as the third image data,
wherein the plurality of sub-color data include first sub-color data, second sub-color data, and third sub-color data, and
the generating of the second image data further includes extracting high frequency components and low frequency components of the first sub-color data, the second sub-color data, and the third sub-color data,
wherein the generating of the second image data further includes:
calculating a distance between the high frequency components of each of the first sub-color data, the second sub-color data, and the third sub-color data; and
detecting two sub-color data with closest distance between the high frequency components, and
wherein the generating of the second image data further includes configuring the sub-color data with a short distance between the high frequency component and an origin of the two sub-color data as the minor sub-color data and configuring the sub-color data with a long distance between the high frequency component and the origin of the two sub-color data as major sub-color data.

10. The driving method of the display apparatus of claim 9, wherein the generating of the recovery minor sub-color data further includes
generating the recovery minor sub-color data by using the low frequency component of the minor sub-color data and the high frequency component of the major sub-color data.

* * * * *